United States Patent
AlYousif et al.

(10) Patent No.: US 11,236,580 B2
(45) Date of Patent: *Feb. 1, 2022

(54) METHODS FOR IMPROVING OIL RECOVERY WITHIN A SUBTERRANEAN FORMATION

(71) Applicant: Saudi Arabian Oil Company, Dhahran (SA)

(72) Inventors: Zuhair AlYousif, Saihat (SA); Ali Abdullah Al-Taq, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,456

(22) Filed: Sep. 4, 2019

(65) Prior Publication Data

US 2021/0062613 A1 Mar. 4, 2021

(51) Int. Cl.
*E21B 33/138* (2006.01)
*C09K 8/518* (2006.01)

(52) U.S. Cl.
CPC ............ *E21B 33/138* (2013.01); *C09K 8/518* (2013.01)

(58) Field of Classification Search
CPC ...... E21B 33/138; E21B 43/20; E21B 43/261; C09K 8/518
See application file for complete search history.

(56) References Cited

U.S. PATENT DOCUMENTS

| | | | |
|---|---|---|---|
| 3,653,440 A * | 4/1972 | Reisberg | C09K 8/584 166/270.1 |
| 4,113,011 A | 9/1978 | Bernard et al. | |
| 4,232,741 A * | 11/1980 | Richardson | C09K 8/518 166/270 |
| 4,694,906 A | 9/1987 | Hutchins et al. | |

(Continued)

FOREIGN PATENT DOCUMENTS

| | | | |
|---|---|---|---|
| CN | 101735789 B | | 4/2013 |
| CN | 104017556 A | * | 9/2014 |

(Continued)

OTHER PUBLICATIONS

Google Patents Translation of CN 104017556A (Year: 2014).*

(Continued)

*Primary Examiner* — Angela M DiTrani Leff
(74) *Attorney, Agent, or Firm* — Dinsmore & Shohl LLP (57) ABSTRACT

A method for improving oil recovery within a subterranean formation that includes forming a barrier within the formation to isolate at least a portion of a first region from a proximate second region. The barrier is formed by introducing a first solution including an ammonium containing compound and a second solution including a nitrite containing compound into the formation. The first solution, the second solution, or both, further include a foaming agent. The compounds react to generate nitrogen gas in the presence of the foaming agent to generate a foam within a first region. The foam provides the barrier. Water is introduced into the formation. The barrier diverts the water away from (Continued)

the first region and into the second region. The water operates to displace at least a portion of a hydrocarbon present in the second region and discharge the hydrocarbon from the formation.

10 Claims, 5 Drawing Sheets

(56) References Cited

U.S. PATENT DOCUMENTS

| | | | |
|---|---|---|---|
| 4,737,296 | A | 4/1988 | Watkins |
| 4,813,484 | A | 3/1989 | Hazlett |
| 4,846,277 | A | 7/1989 | Khalil et al. |
| 5,105,884 | A | 4/1992 | Sydansk |
| 5,129,457 | A | 7/1992 | Sydansk |
| 5,295,540 | A | 3/1994 | Djabbarah et al. |
| 7,148,184 | B2 | 12/2006 | Francini et al. |
| 7,464,754 | B1 | 12/2008 | Decker et al. |
| 9,951,264 | B2 | 4/2018 | Penny et al. |
| 2016/0319182 | A1* | 11/2016 | Al-Nakhli ........... E21B 43/2405 |

FOREIGN PATENT DOCUMENTS

| | | |
|---|---|---|
| CN | 103160266 B | 5/2015 |
| WO | 2014149524 A1 | 9/2014 |

OTHER PUBLICATIONS

Al-Qasim et al. "CO2 Foam Rheology Behavior under Reservoir Conditions" Saudi Aramco Journal of Technology (2017) 9 pgs.
International Search Report and Written Opinion dated May 12, 2020 pertaining to International application No. PCT/US2019/067732 filed Dec. 20, 2019, 15 pgs.
Wang et al. "Application and Mechanisms of Self-Generated Heat Foam for Enhanced Oil Recovery" Energy & Fuels, Aug. 6, 2018, pp. 9093-9105, vol. 32, No. 9.
International Search Report and Written Opinion dated May 25, 2020 pertaining to International application No. PCT/US2019/059066 filed Oct. 31, 2019, 13 pgs.
Office Action dated Sep. 15, 2020 pertaining to U.S. Appl. No. 16/560,450, filed Sep. 4, 2019, 28 pgs.
U.S. Office Action dated Aug. 6, 2021 pertaining to U.S. Appl. No. 16/560,450, filed Sep. 4, 2019, 24 pages.

* cited by examiner

METHODS FOR IMPROVING OIL RECOVERY WITHIN A SUBTERRANEAN FORMATION

TECHNICAL FIELD

The present disclosure relates to natural resource well drilling and hydrocarbon production from subterranean formations and, more specifically, to methods for improving oil recovery within a subterranean formation.

BACKGROUND

The discovery and extraction of hydrocarbons, such as oil or natural gas, from subterranean formations may be impeded for a variety of reasons, such as inherently poor permeability or damage to the subterranean formation. As a result, the production rate of hydrocarbons from a hydrocarbon-producing region of the subterranean formation may be reduced compared to the expected production rate. In these instances, additional methods for recovery from the hydrocarbon-producing regions of the subterranean formation, also referred to as secondary recovery treatments, can be utilized to improve hydrocarbon production.

Secondary recovery treatments may include the injection of gas or water into the subterranean formation to maintain pressure within the hydrocarbon-producing region and displace hydrocarbons towards the wellbore. The optimal application of each treatment depends on the properties of the formation, the hydrocarbon being recovered, or both. However, in some cases, treatment materials used in secondary recovery treatments may undesirably flow out of the hydrocarbon-producing region of the subterranean formation in which the treatment is being conducted and into other regions of the subterranean formation. Flow of treatment materials into other regions of the subterranean formation can result in loss of treatment materials, an increase in the quantity of treatment materials required to conduct the treatment, and a reduction in the volumetric sweep of the treatment. Conventional methods to prevent the flow of treatment materials into other regions of the subterranean formation may include the use of foam barriers within the subterranean formation to divert treatment materials away from portions of the subterranean formation. Typically, foam barriers are generated when an injection gas is mixed with an injection fluid containing a surfactant. The injection gas may be mixed with an injection fluid already present within the subterranean formation, injected into the subterranean formation simultaneously with an injection fluid, or mixed with an injection fluid prior to being injected into the subterranean formation. However, the direct injection of a gas or previously generated foam into a subterranean formation consumes significant amounts of energy due to the challenges of pumping a gas or viscous foam at a sufficient rate.

SUMMARY

Accordingly, there is an ongoing need for methods for producing barriers for diverting treatment materials during secondary recovery treatments. The methods and compositions of the present disclosure include methods that readily generate a foam within subterranean formations without the need for energy intensive injections of gas or foam. In particular, the methods of the present disclosure include introducing a first solution including an ammonium containing compound, a second solution including a nitrate containing compound, and a foaming agent into the subterranean formation. Upon mixing within the subterranean formation, the two compounds may react to form a nitrogen gas in the presence of the foaming agent to generate a foam within the subterranean formation. This foam may be operable to divert subsequently introduced treatment materials, such as water, into target regions of the subterranean formation and, as a result, reduce the loss of treatment materials and increase the volumetric sweep of the treatment method.

According to one or more embodiments of the present disclosure, a method for improving oil recovery within a subterranean formation is disclosed. The method includes forming a barrier within a first region of the subterranean formation to isolate at least a portion of the first region from a proximate second region of the subterranean formation. The barrier is formed by introducing a first solution including an ammonium containing compound and a second solution including a nitrite containing compound into the subterranean formation. The first solution, the second solution, or both, further include a foaming agent. The ammonium containing compound and the nitrite containing compound react to generate nitrogen gas in the presence of the foaming agent to generate a foam within a first region of the subterranean formation. The foam provides the barrier. Water is introduced into the subterranean formation. The barrier diverts the water away from the first region and into the second region. The water operates to displace at least a portion of a hydrocarbon present in the second region and discharge the hydrocarbon from the subterranean formation.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Reference will now be made in detail to embodiments of a method for improving oil recovery within a subterranean formation.

As used throughout this disclosure, the term "foam quality" refers to the ratio of the volume of gas to the total volume of gas and liquid in a foam.

As used throughout this disclosure, the term "energized fluid system" refers to a treatment fluid that includes at least one compressible, sometimes soluble, gas phase. The average foam quality of an energized fluid system may be less than 52 percent (%).

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing. Coiled tubing may also be used as part of the production tubing.

The present disclosure is directed to compositions and methods for improving oil recovery within a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface. This initial stage of production is referred to as "primary recovery."

In primary recovery, natural formation energy, such as gasdrive, waterdrive, or gravity drainage, displaces hydrocarbons from the subterranean formation into the wellbore and up to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons toward the wellbore and up to the surface. However, as the formation pressure decreases due to hydrocarbon production, the differential pressure also decreases. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the total initial hydrocarbons in the subterranean formation are extracted (typically around 10% by volume for hydrocarbon-containing subterranean formations).

During a second recovery stage of hydrocarbon production, treatment materials such as water or gas may be injected into the subterranean formation through injection wells positioned in rock that is in fluid communication with production wells. As used in the present disclosure, the term "injection well" may refer to a well in which fluids are injected into the subterranean formation rather than produced from the subterranean formation. Secondary recovery may operate to maintain formation pressure and to displace hydrocarbons toward the wellbore. The secondary recovery stage reaches its limit when the treatment materials (water or gas) are produced from the production well in amounts sufficient such that the production of hydrocarbons is no longer economical. However, these treatment materials may flow into other regions of the formation that may not be hydrocarbon-producing regions. This may result in loss of treatment materials. The loss of treatment materials may further result in an increase in the quantity of the treatment materials required to conduct the secondary recovery treatments.

Loss of treatment materials during secondary recovery treatments may be reduced by using a means of diversion. As used in this disclosure, the term "diversion" refers to a process of forming a barrier in the formation to at least partially isolate a region of the formation from other regions of the formation. For example, in embodiments, a barrier may be formed in the formation to isolate at least a portion of a region undergoing secondary recovery treatment from at least one other region and to prevent or reduce the flow of treatment materials from the region undergoing secondary recovery treatment to other regions of the formation. Producing a barrier in the formation may enable treatment materials to be focused on the hydrocarbon-producing regions undergoing secondary recovery treatment and may reduce loss of treatment materials to other regions of the formation. In embodiments, the barrier formed during diversion may be temporary. This may enable a well to produce from that region when the secondary recovery treatment is complete.

There are two main categories of diversion: chemical diversion and mechanical diversion. Chemical diversion includes the use of a chemical agent to achieve diversion during secondary recovery treatments. Some examples of diversion materials include benzoic acid, oil-soluble resins, rock salt, gels, foams, cements, or combinations of these. Some diversion materials, including gels and foams, have a limited time frame for use during which they may be pumped into the formation before the gel, foam, or cement transforms into a solid which can no longer be pumped into the formation. Additionally, the greater viscosities of conventional foams, compared to the compositions of the present disclosure, may limit the distance into the formation that these diversion materials can be injected. Furthermore, the costs associated with these diversion materials may be prohibitive, especially when the diversion materials are purchased and used in large quantities, as is typical for diverting treatment materials from a portion of a hydrocarbon-bearing formation. For example, conventional foams may be produced by the simultaneous injections of an injection fluid including at least a surfactant and an injection gas. However, the transportation of the necessary equipment to the injection well and the injection of gas may be inefficient and cost prohibitive.

The present disclosure is directed to a method for improving oil recovery within a subterranean formation. In particular, methods for improving oil recovery during secondary recovery treatments. The method may include forming a barrier within a first region of the subterranean formation to isolate at least a portion of the first region from a proximate second region of the subterranean formation. The barrier is formed by introducing a first solution including an ammonium containing compound and a second solution including a nitrite containing compound into the subterranean formation. The first solution, the second solution, or both, further include a foaming agent. The ammonium containing compound and the nitrite containing compound react to generate nitrogen gas in the presence of the foaming agent to generate a foam within a first region of the subterranean formation. The foam provides the barrier. Water is introduced into the subterranean formation. The barrier diverts the water away from the first region and into the second region. The water operates to displace at least a portion of a hydrocarbon present in the second region and discharge the hydrocarbon from the subterranean formation.

Figure 1:
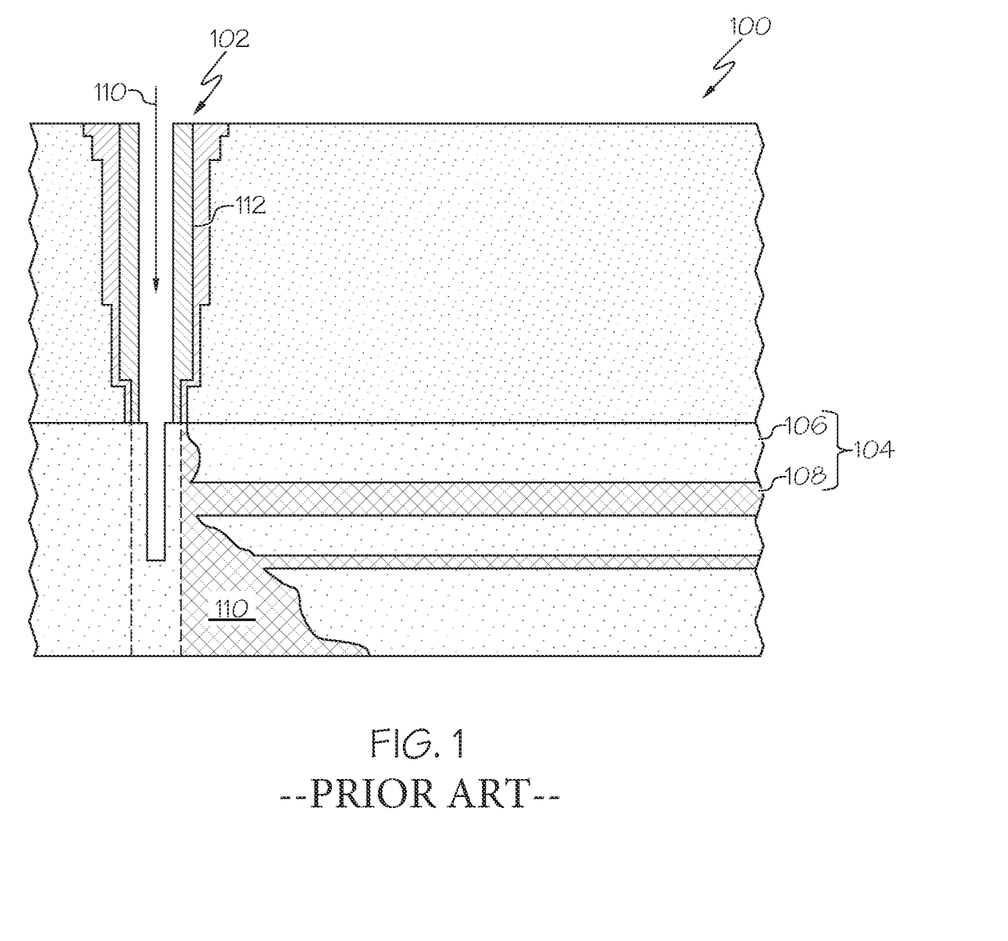
FIG. 1 is a schematic drawing of a wellbore during a standard waterflooding oil recovery operation depicting gravity override and viscous fingering issues.

Referring now to FIG. 1, an example installation 100 during an initial secondary recovery treatment is depicted. As shown in FIG. 1, the installation 100 may include an injection well 102 which may be in fluid communication with a subterranean formation 104. The subterranean formation 104 includes a first region 106 and a proximate second region 108. The waterflood 110 may be introduced into the subterranean formation 104 through the production tubing 112 of the injection well 102. As shown in FIG. 1, the waterflood 110 bypasses the second region 108 to pass through the first region 106. This bypass of regions of the subterranean formation by portions of the treatment fluid may be referred to as "viscous fingering." Without being bound by any particular theory, it is believed that viscous fingering may be caused, at least in part, by gravity override of the treatment materials and heterogeneity of the subterranean formation. As used in the present disclosure, the term "gravity override" may refer to the preferential flow of a less dense material, such as the waterflood 110, to the top of the subterranean formation and the subsequent flow of more dense material, such as hydrocarbons, to the bottom of the subterranean formation. The term "heterogeneity" may refer to variations, such as the presence of greater permeability streaks and heavily fractured zones, within a subterranean formation.

In the subterranean formation 104, as depicted in FIG. 1, the first region 106 may be more permeable than the second region 108. For example, the first region 106 may be at least 10%, at least 100%, or at least 1000% more permeable than the second region 108. This difference in permeability may cause the waterflood 110 to favorably pass through the first region 106 while bypassing the second region 108. Consequently, the volumetric sweep of an initial secondary recovery treatment in example installation 100 may be relatively poor. That is, the relatively greater mobility of the waterflood 110 through the relatively permeable first region 106 as compared to the second region 108 may result in early breakthrough of the waterflood 110, resulting in the bypass of residual and trapped oil present in the second region 108 of the subterranean formation 104. As used in the present disclosure, the term "breakthrough" may refer to a gas or fluid, such as a treatment material, gaining access to a production wellbore from the subterranean formation. This early breakthrough may result in the need for increased water, decreasing the efficiency of the secondary recovery treatment.

Figure 2:
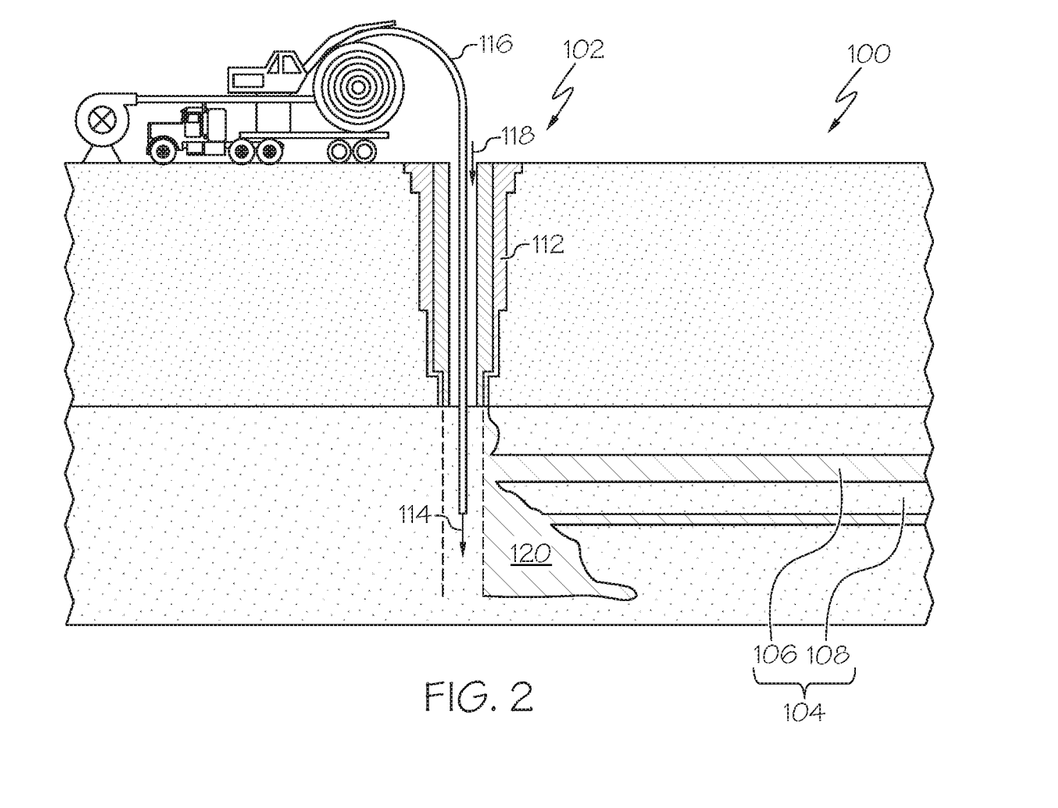
FIG. 2 is a schematic drawing of a wellbore during a treatment process with a foam, according to one or more embodiments described in this disclosure.

Referring now to FIG. 2, the example installation 100 during the disclosed method of diversion is depicted. As shown in FIG. 2, the first solution 114 may be introduced into the subterranean formation 104 through a coiled tubing 116. The second solution 118 may be introduced into the subterranean formation 104 through the production tubing 112 of the injection well 102. Due to the relatively greater permeability of the first region 106, as discussed previously, the first solution 114 and the second solution 118 bypass the second region 108 to pass through the first region 106. The first solution 114 and the second solution 118 react within the first region 106 of the subterranean formation 104 to form a foam 120 within the first region 106.

In the presently disclosed embodiments, the first solution includes an ammonium containing compound. In some embodiments, the ammonium containing compound may be an ammonium salt. For example, in some embodiments the ammonium containing compound may be ammonium chloride ($NH_4Cl$), ammonium bromide ($NH_4Br$), ammonium nitrate ($NH_4NO_3$), ammonium nitrite ($NH_4NO_2$), ammonium sulfate (($NH_4)_2SO_4$), ammonium carbonate (($NH_4)_2CO_3$), or combinations of these. In some other embodiments, the first solution may include an acid. A variety of acids may be used. In some embodiments, the acid may be hydrochloric acid (HCl), hydrofluoric acid (HF), acetic acid ($CH_3COOH$), formic acid (HCOOH), or combinations of these.

In the presently disclosed embodiments, the second solution includes a nitrite containing compound. In some embodiments, the nitrite containing compound may be a nitrite salt. For example, in some embodiments the nitrite containing compound may be sodium nitrite ($NaNO_2$), potassium nitrite ($KNO_2$), or combinations of these. In some embodiments, the second solution may be substantially free of acid. As used in the present disclosure, "substantially free" means that the second solution includes less than 5% by volume, less than 4% by volume, less than 3% by volume, less than 2% by volume, less than 1% by volume, or less than 0.1% by volume of an acid. Acid present in the second solution may result in undesirable nitric oxide and side product generation when the acid is mixed with the nitrite containing compound.

In embodiments, the molar ratio of the nitrite containing compound to the ammonium containing compound introduced to the subterranean formation may be from 1:1 to 3:1. For example, in some embodiments the molar ratio of $NaNO_2$ to $NH_4Cl$ introduced to the subterranean formation may be from 1:1 to 3:1; from 1.5:1 to 3:1; from 2:1 to 3:1; from 2.5:1 to 3:1; from 1:1 to 2.5:1; from 1:1 to 2:1; from 1:1 to 1.5:1; from 1.5:1 to 2.5:1; from 1.5:1 to 2:1; or from 2:1 to 2.5:1. A greater molar ratio of $NaNO_2$ relative to $NH_4Cl$ allows for an increased reaction rate. Additionally, a $NaNO_2$ to $NH_4Cl$ molar ratio of at least 2:1 allows for the first solution and the second solution containing the reactants to be provided in a volume ratio of 1:1 which may provide practical industrial benefits. The concentration of $NaNO_2$ in the second solution and $NH_4Cl$ in the first solution may be selected based on the reaction kinetics of the system, the solubility of the compounds in water based on temperature, and the desired foam characteristics.

One or both of the first solution and the second solution also include a foaming agent. In embodiments, one or both of the first solution and the second solution may include a foaming agent in an amount of from 1 gallon per thousand gallons of solution (gpt) to 20 gpt, from 2.5 gpt to 20 gpt, from 5 gpt to 20 gpt, from 10 gpt to 20 gpt, from 15 gpt to 20 gpt, from 1 gpt to 15 gpt, from 1 gpt to 10 gpt, from 1 gpt to 5 gpt, or from 1 gpt to 2.5 gpt. In some embodiments, the foaming agent comprises a surfactant. Generally, surfactants are chemicals which reduce the surface tension of the treatment fluid or interfacial tension between treatment fluids, allowing for foam generation upon the production of nitrogen gas. However, in some embodiments of the present disclosure, the first solution and the second solution may have a pH less than or equal to 4.0. Therefore, in some embodiments it may be advantageous for the foaming agent to be able to maintain structural integrity in acidic environments having a pH less than or equal to 4.0 without deterioration. Acid-tolerant surfactants are able to operate in the acidic environments of such treatment fluids upon the generation of nitrogen gas.

In embodiments, the surfactant may stabilize the generated foam. Different types of surfactants, such as anionic, cationic, nonionic, amphoteric, and zwitterionic surfactants, may be used to produce foam for a variety of applications. As such, the selection of surfactant should be determined by the desired application and the chemistry of the surfactant and foam. However, it should be understood that any compound which may stabilize the generated foam may be classified as a surfactant suitable for use in embodiments of the present disclosure. For example, surface modified nanoparticles may achieve the same stabilization effect as a conventional surfactant. Additionally, other materials, such as polymers and nanoparticles, may be used to improve the efficiency of the surfactant. For example, a polymer may be used to produce a more stable foam.

In embodiments, the first solution and the second solution are introduced into the subterranean formation separately. In some embodiments, the first solution is introduced into the subterranean formation through a first conduit and the second solution introduced into the subterranean formation through a second conduit. In embodiments, the first conduit and the second conduit may each be a coiled tubing, the production tubing of the injection well, or the annulus of the injection well. For example, the first solution may be introduced into the subterranean formation through a coiled tubing and the second solution may be introduced into the subterranean formation through a production tubing.

In embodiments, the first solution and the second solution are introduced into the subterranean formation in a serial manner. In some embodiments, the first solution is introduced into the subterranean formation followed by the second solution. In some embodiments, the second solution is introduced into the subterranean formation followed by the first solution. In some other embodiments, the first solution and the second solution are introduced into the subterranean formation simultaneously.

The first solution and the second solution are mixed within the subterranean formation. In embodiments, the first solution and the second solution are mixed within a first region of the subterranean formation. In other embodiments, the first solution and the second solution are mixed within subterranean formation prior to being introduced to the first region. The resulting mixture may be maintained in the first region of the subterranean formation, allowing the ammonium containing compound and the nitrite containing compound to react and generate nitrogen gas. For clarity and conciseness, Reaction 1 is described using $NH_4Cl$ as the ammonium containing compound and $NaNO_2$ as the nitrite containing compound. However, it should be understood by a person of ordinary skill in the art that compounds of similar class of reactants will generally react in a similar way as the example reaction schemes shown in Reaction 1. $NaNO_2$ and $NH_4Cl$ react to form nitrogen gas as illustrated by:

$$NH_4Cl + NaNO_2 \rightarrow N_2(g) + NaCl + 2H_2O + \Delta H \text{ (heat)} \quad \text{REACTION 1}$$

The chemical equilibrium and reaction dynamics are affected by at least temperature, pressure, pH, and molar ratios of reactants. For example, when the molar ratio of $NaNO_2$ to $NH_4Cl$ is at least 1:1 the reaction may occur spontaneously at a more acidic pH, such as equal to or less than 4.0, or at a temperature equal to or greater than 60° C. As the acid is included in the first solution of the disclosed method, Reaction 1 may be triggered immediately upon mixing of the first and second solutions when the pH of the treatment fluid is less than or equal to 4.0. This allows the generation of nitrogen gas to occur spontaneously regardless of other environmental conditions upon mixing of the first and second solutions in those embodiments in which the nitrite containing compound comprises $NaNO_2$ and the ammonium containing compound comprises $NH_4Cl$.

In some embodiments, the pH of the mixture of the first solution and the second solution is less than or equal to 7.0 and greater than or equal to 1.0; less than or equal to 6.5 and greater than or equal to 1.5; less than or equal to 6.0 and greater than or equal to 2.0; less than or equal to 5.5 and greater than or equal to 2.5; less than or equal to 5.0 and greater than or equal to 3.0; less than or equal to 4.5 and greater than or equal to 3.5; or less than 4.0. In accordance with one or more embodiments, it may be advantageous for the mixture of the first solution and the second solution to have a pH less than or equal to 4.0 in environments where the temperature is not equal to or greater than 60° C., but in-situ foam generation is still desired. However, if the pH of the mixture of the first solution and the second solution is too acidic, the concentration of the ammonium containing compound may be unnecessarily diluted and the subsequent resulting nitrogen gas and heat generation may be unnecessarily decreased. Additionally, as the pH of the mixture of the first solution and the second solution is increased the potential of carbonate scaling occurring in the subterranean formation is enhanced. Therefore, it may be advantageous for the mixture of the first solution and the second solution to have a sufficiently acidic pH for the spontaneous generation of nitrogen gas while also preventing the dilution of the ammonium containing compound in the first solution.

In some embodiments, the pH of the mixture of the first solution and the second solution is greater than 4.0 when initially introduced to the subterranean formation and decreases to be less than 4.0 upon introduction of a gas injected during primary or secondary recovery operations. For example, carbon dioxide ($CO_2$) gas may be injected into the injection well to maintain the pressure in the formation. When $CO_2$ gas is dissolved in water, such as water present in the first or second solutions, carbonic acid may be generated. As such, when $CO_2$ gas is introduced to the subterranean formation, at least a portion may be dissolved within the mixture of the first solution and the second solution. This interaction may generate carbonic acid and decrease the pH of the mixture of the first solution and the second solution. Consequently, the introduction of $CO_2$ gas into the subterranean formation may trigger the mixture of the first solution and the second solution to react and generate nitrogen gas.

Upon generation of the nitrogen gas, the foaming agent present in at least one of the first solution and the second solution retains the generated nitrogen gas to generate a foam. That is, a foam may be generated without the need for an external source of nitrogen gas. As such, the need for inefficient and expensive equipment to be transported to the subterranean formation is eliminated. This may increase the efficiency of the use of foams. Foams may have an average foam quality (FQ) equal to or greater than about 52%. Systems with a foam quality less than 52% may be classified as an energized fluid system. The foam quality of a system may be calculated by:

$$FQ=VG/(VG+VL) \qquad \text{EQUATION 1}$$

where VG is the volume of gas and VL is the volume of liquid. However, due to the volume of gas being dependent on the injection and subterranean formation conditions, foam quality of the foam cannot be determined prior to the generation of the system within the formation. Further, where nitrogen gas is generated in-situ, the volume of gas will continue to increase as the reaction of the ammonium containing compound and the nitrite containing compound progresses to completion. As such, foam quality of the generated foam should be expected to be greater in portions of the first region where the first solution and the second solution are mixed earlier. For example, foam quality of the generated foam may be greater in portions of the first region closer to the production tubing of the injection well relative to portions of the first region that are further from the production tubing of the injection well.

In some embodiments, the generated foam may have a viscosity at least 15 times greater than the viscosity of the treatment materials. For example, in secondary recovery treatments that utilize the injection of water, such as that described with regard to FIG. 1, the generated foam may have a viscosity at least 15 times greater than water. In some embodiments, the generated foam may have a viscosity at least 20 times greater, at least 25 times greater, at least 30 times greater, at least 35 times greater, at least 40 times greater, at least 45 times greater, or at least 50 times greater than the viscosity of the treatment materials. When the viscosity of the generated foam is not at least 15 times greater than the viscosity of the treatment materials, the ability of the foam to divert the treatment materials away from the regions of the subterranean formation with relatively greater permeability may be reduced. That is, portions of the treatment materials may still bypass the relatively less permeable regions of the subterranean formation and the resulting volumetric sweep may be reduced. As the difference between the viscosity of the generated foam and the viscosity of the treatment materials increases, the capability of the generated foam to divert the treatment materials may increase and the volumetric sweep of the enhanced oil recovery treatment may also increase.

Figure 3:
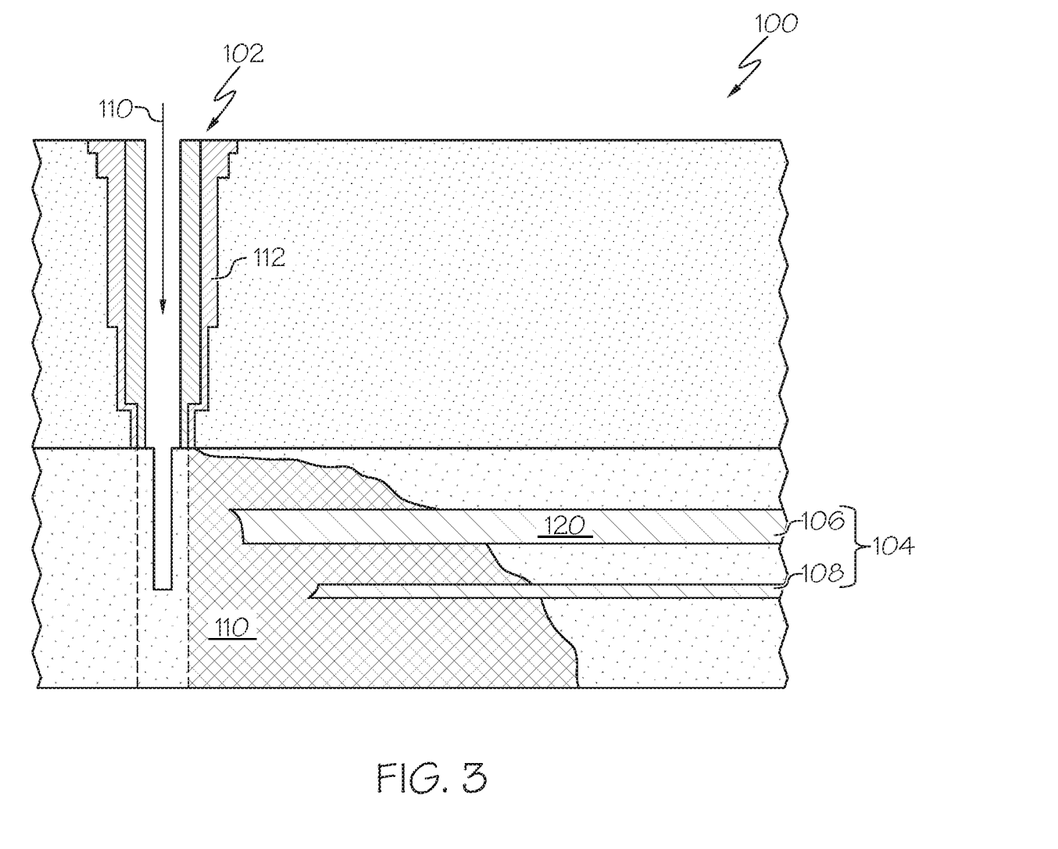
FIG. 3 is a schematic drawing of a wellbore during a waterflooding oil recovery operation after a treatment process with a foam, according to one or more embodiments described in this disclosure.

Referring now to FIG. 3, the example installation 100 during a secondary recovery treatment, conducted subsequently to the disclosed method of diversion, is depicted. As shown in FIG. 3, the waterflood 110 is again introduced to the subterranean formation 104 through the production tubing 112 of the injection well 102. However, due to the presence of the foam 120 within the first region 106, the waterflood 110 is at least partially diverted from passing through the first region 106. Consequently, at least a portion of the waterflood 110 passes through the relatively impermeable second region 108. In some embodiments, at least 50% of the waterflood 110 may be diverted from the first region 106 to the second region 108. For example, from 50% to 99%, from 50% to 90%, from 50% to 75%, from 50% to 60%, from 60% to 99%, from 75% to 99%, or from 90% to 99% of the waterflood 110 may be diverted from the first region 106 to the second region 108. As a result, the volumetric sweep of the secondary recovery treatment conducted after the disclosed diversion method may be greater due to the foam 120 creating a barrier that diverts the water away from the first region 106 and prevents at least some bypass of the residual and trapped oil present in the subterranean formation 104. Additionally, this may reduce the amount of water necessary as well as increase the efficiency of the secondary recovery operation.

EXAMPLES

The following examples illustrate features of the present disclosure but are not intended to limit the scope of the disclosure.

Example 1

Figure 4:
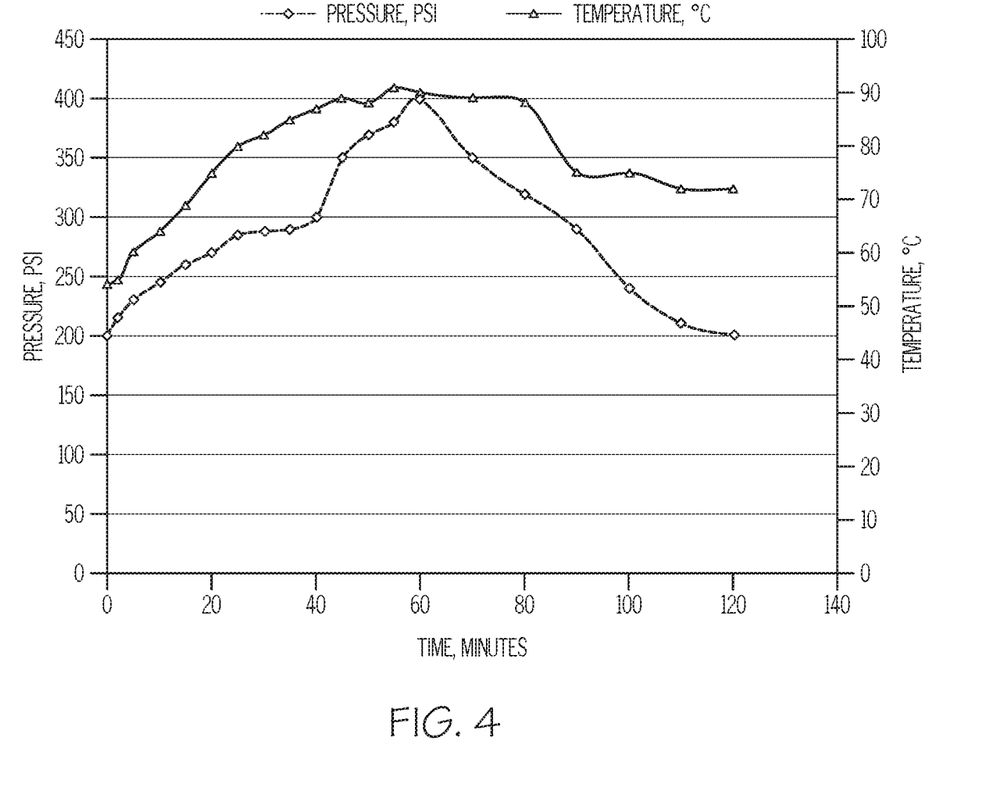
FIG. 4 is a graph illustrating temperature and pressure with respect to time during bench-top scale preparation of an exothermic reaction of ammonium chloride, sodium nitrite, and acetic acid, according to one or more embodiments described in this disclosure.

FIG. 4 shows an example in-situ foam generation by reaction of 110 milliliters (mL) of an aqueous solution including 36 mL $NH_4Cl$ mixed with 10 mL $CH_3COOH$ and 64 mL $NaNO_2$. This experiment was conducted using a standard 400 mL "High Temperature, High Pressure" (HT/HP) Cell under static conditions. The cell was first placed in a heating jacket for 20 minutes and allowed to reach 71° C. The reactants were placed inside the cell, which was then closed. The cell was then pressurized to 200 pounds per square inch (psi) to overbalance the pressure and the reaction was allowed to proceed for 2 hours. The temperature and pressure changes associated with the reaction were recorded and are presented in FIG. 4.

Referring to FIG. 4, the curves showing the temperature and the pressure throughout the reaction of $NH_4Cl$, $NaNO_2$, and $CH_3COOH$ are presented. The temperature and pressure increased significantly from 54° C. and 200 psi to 91° C. and 400 psi, respectively, over the span of 60 minutes. The temperature increase is believed to be the result of the exothermic nature of the reaction. As evidenced by FIG. 4, the reaction of $NH_4Cl$ and $NaNO_2$ is capable of generating a substantial increase of pressure within a formation. This pressure increase is believed to be the result of the generation of nitrogen gas as a product of the reaction, as detailed by Reaction 1 supra. This increase in pressure and generation of nitrogen gas may be useful in generating a foam in the presence of a foaming agent as well as increasing the pressure within a subterranean formation. That is, the embodiments of the present disclosure display suitable characteristics for the in situ generation of a foam within a subterranean formation. As further evidenced by FIG. 4, the pressure increase may occur over the course of 60 minutes or more. This reaction timeframe may be useful as it allows for positioning the reactants, for example pumping a first solution and a second solution into a subterranean formation, in a low viscosity liquid-state prior to the increase of pressure and the generation of foam.

Example 2

Foam behavior simulation was conducted to determine viscosity and shear rate values in simulated foam generation processes under subterranean formation conditions. Specifically, subterranean formation conditions with respect to both temperature and pressure were created for testing of both in-situ gas generated foam in accordance with the present disclosure and conventional foam. This experiment was conducted using a M9200 HT/HP Foam Loop Rheometer system available from Grace Instrument.

The rheometer was first calibrated with Newtonian fluids with a known viscosity to ensure the correct measurement of viscosities and subsequently put under a vacuum to remove all fluids. An $NH_4Cl$ salt solution was first injected into the rheometer, followed by a solution of $NaNO_2$ salt and a methanol surfactant foamer commercially available as F107 from Schlumberger. The molar ratio of the $NaNO_2$ salt to the $NH_4Cl$ salt within the solutions was approximately 2:1. The solutions were then allowed to equilibrate in the rheometer at a temperature of 60° C. The mixture was circulated in the capillary loop of the rheometer to ensure proper mixing and foam formation during the generation of nitrogen gas by the reaction between the two salts. Sample viscosities of the generated foam were then measured at different shear rates.

Viscosity ($\mu_{apparent}$) of the generated foam was calculated by:

$$\mu_{apparent} = \frac{\tau}{\gamma} \quad \text{EQUATION 2}$$

where $\tau$ is the shear stress calculated by:

$$\tau = \frac{D\,\Delta P}{4L} \quad \text{EQUATION 3}$$

$\gamma$ is the shear rate calculated by:

$$\gamma = \frac{8V}{D} \quad \text{EQUATION 4}$$

and D is the tube diameter, $\Delta P$ is the differential pressure across the rheometer, L is the tube length, and V is the velocity.

The process was then repeated using a conventional foam. After calibration, an aqueous solution containing a foaming agent was injected into the rheometer, followed by an injection of nitrogen gas. A foam was generated in the loop and allowed to equilibrate in the rheometer at a temperature of 60° C. The foam was circulated in the capillary loop of the rheometer to ensure proper foam formation. Sample viscosities of the conventional foam were then also measured at different shear rates.

Figure 5:
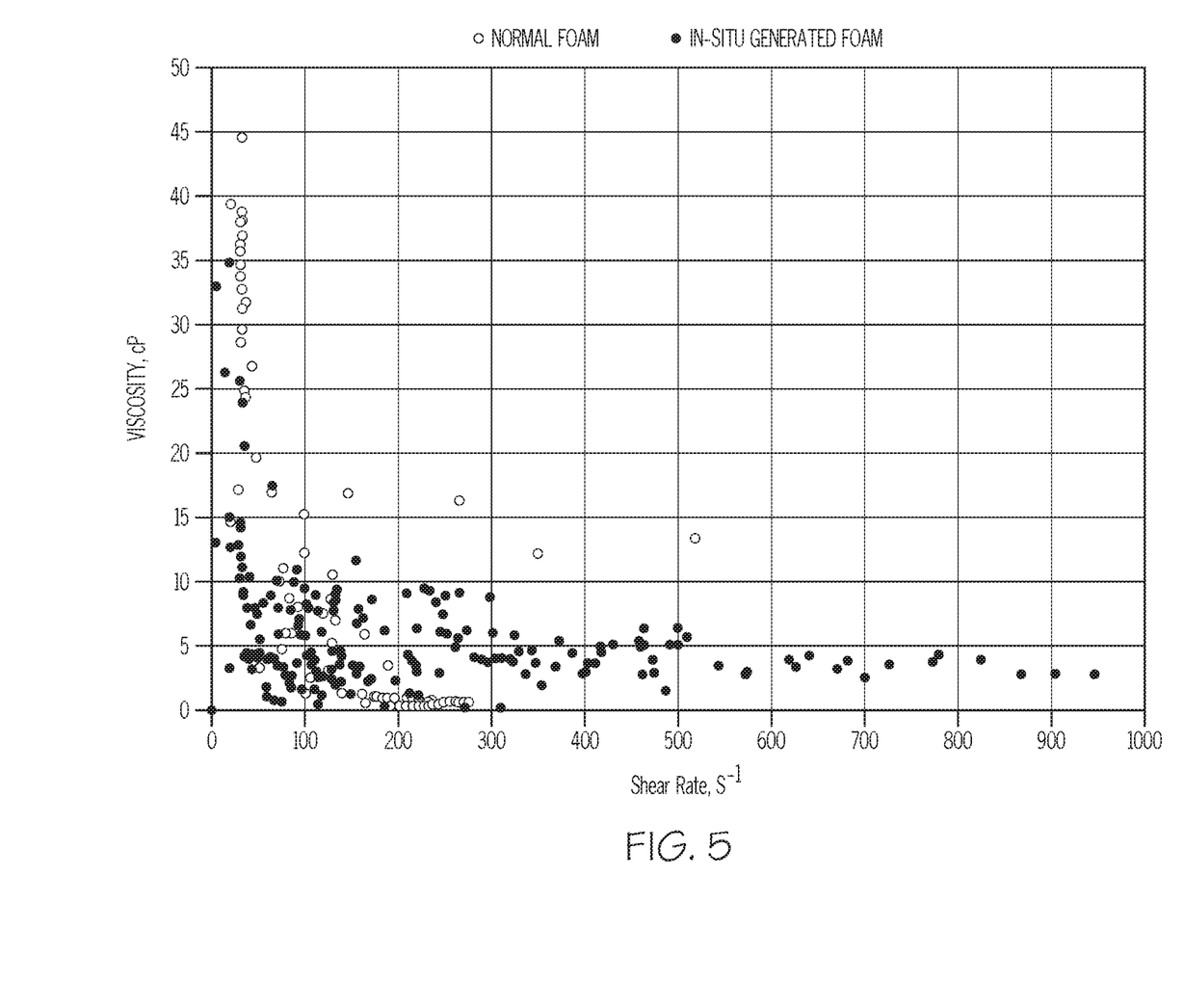
FIG. 5 is a graph comparatively illustrating the viscosity with respect to shear rate of a foam conventionally generated using an external source of nitrogen and a foam generated according to one or more embodiments described in this disclosure.

FIG. 5 plots the relationships between viscosity and shear rate at various points as the two foams are constantly circulated and sheared in the loop. Initially, at shear rates from about 0 inverse seconds ($s^{-1}$) to about 100 $s^{-1}$, the conventional foam had a maximum viscosity near about 45 centipoise (cP) and an average viscosity near about 35 cP. In-situ gas generated foam had a maximum viscosity near about 35 cP and an average viscosity near about 10 cP. When the shear rate of the system increased, to from about 100 $s^{-1}$ to about 300 $s^{-1}$, the average viscosity of the conventional foam dropped to about 1 cP while the average viscosity of the in-situ gas generated foam remained near about 10 cP.

As evidenced by FIG. 5, in-situ generated foam is capable of achieving similar or superior viscosities when compared to conventional foam at various shear rates. Further, at greater shear rates, the conventional foam displayed a greater than 90% decrease in viscosity. This reduced viscosity may result in an inability to effectively divert secondary recovery treatment materials away from the region the foam is blocking. As such, FIG. 5 demonstrates that the method presently disclosed is capable of generating a foam within a subterranean formation that displays comparable or superior properties in regard to other systems. That is, the method presently disclosed effectively eliminates the requirements of injecting foam or nitrogen gas without a loss of quality.

It should now be understood the various aspects of the method for improving oil recovery within a subterranean formation are described and such aspects may be utilized in conjunction with various other aspects.

According to a first aspect, a method for improving oil recovery within a subterranean formation includes forming a barrier within a first region of the subterranean formation to isolate at least a portion of the first region from a proximate second region of the subterranean formation. The first region comprises a greater permeability than the second region. The barrier is formed by introducing a first solution including an ammonium containing compound and a second solution including a nitrite containing compound into the subterranean formation. The first solution, the second solution, or both, further include a foaming agent. The ammonium containing compound and the nitrite containing compound react to generate nitrogen gas in the presence of the foaming agent to generate a foam within a first region of the subterranean formation. The foam provides the barrier. The method may further include introducing water into the subterranean formation. The barrier diverts the water away from the first region and into the second region. The water operates to displace at least a portion of a hydrocarbon present in the second region and discharge the hydrocarbon from the subterranean formation.

A second aspect includes the method of the first aspect in which the second solution comprises the foaming agent.

A third aspect includes either of the first or second aspects in which the first solution and the second solution are introduced into the subterranean formation separately.

A fourth aspect includes the method of the third aspect in which the first solution is introduced into the subterranean formation through a first conduit and the second solution introduced into the subterranean formation through a second conduit.

A fifth aspect includes the method of any of the first through fourth aspects in which the nitrite containing compound comprises $NaNO_2$ and the ammonium containing compound comprises $NH_4Cl$.

A sixth aspect includes the method of the fifth aspect in which the molar ratio of $NaNO_2$ to $NH_4Cl$ is from 1:1 to 2:1.

A seventh aspect includes the method of any of the first through sixth aspects in which the pH of a mixture of the first solution and the second solution is less than or equal to 4.0.

An eighth aspect includes the method of the seventh aspect in which the mixture of the first solution and the second solution further comprises carbonic acid.

A ninth aspect includes the method of any of the first through eighth aspects in which the foaming agent comprises an acid tolerant surfactant.

A tenth aspect includes the method of any of the first through ninth aspects in which the first solution and the second solution are introduced into the subterranean formation in a serial manner.

An eleventh aspect includes the method of any of the first through tenth aspects in which the first solution and the second solution are introduced into the subterranean formation simultaneously.

A twelfth aspect includes the method of any of the first through eleventh aspects in which the viscosity of the generated foam is from 1 cP to about 50 cP.

A thirteenth aspect includes the method of any of the first through twelfth aspects in which the first region is at least 10% more permeable than the second region.

A fourteenth aspect includes the method of any of the first through thirteenth aspects in which from 50% to 99% of the carbon dioxide is diverted from the first region to the second region.

A fifteenth aspect includes the method of any of the first through fourteenth aspects in which the viscosity of the generated foam is at least 15 times greater than the viscosity of the water.

A sixteenth aspect includes the method of the fifteenth aspect in which the viscosity of the generated foam is from 15 times greater to 50 times greater than the viscosity of the water.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method for improving oil recovery within a subterranean formation, the method comprising:
   forming a barrier within a first region of the subterranean formation to isolate at least a portion of the first region from a proximate second region of the subterranean formation, where the first region comprises a greater permeability than the second region, forming the barrier comprising the steps of:
   introducing a first solution through a first conduit into the first region of the subterranean formation, the first solution comprising $NH_4Cl$; and
   introducing a second solution, separate from the first solution, through a second conduit into the first region of the subterranean formation, the second solution comprising $NaNO_2$, where:
      the first solution, the second solution, or both, further comprise a foaming agent;
      the molar ratio of $NaNO_2$ to $NH_4Cl$ is from 1.5:1 to 3:1;
      the pH of a mixture of the first solution and the second solution is less than or equal to 4.0; and
      the ammonium containing compound and the nitrite containing compound react to generate nitrogen gas in the presence of the foaming agent to generate a foam within the first region of the subterranean formation, the foam providing the barrier; and
   introducing water into the subterranean formation, where the barrier diverts the water away from the first region and into the second region such that the water operates to displace at least a portion of a hydrocarbon present in the second region and discharge the hydrocarbons from the subterranean formation.

2. The method of claim 1, in which the second solution comprises the foaming agent.

3. The method of claim 1, in which the mixture of the first solution and the second solution further comprises carbonic acid.

4. The method of claim 1, in which the foaming agent comprises an acid tolerant surfactant.

5. The method of claim 1, in which the first solution and the second solution are introduced into the subterranean formation in a serial manner.

6. The method of claim 1, in which the first solution and the second solution are introduced into the subterranean formation simultaneously.

7. The method of claim 1, in which the viscosity of the generated foam is from 1 cP to about 50 cP.

8. The method of claim 1, in which the first region is at least 10% more permeable than the second region.

9. The method of claim 1, in which from 50% to 99% of the water is diverted from the first region to the second region.

10. The method of claim 1, in which the viscosity of the generated foam is from 15 times greater to 50 times greater than the viscosity of the water.

* * * * *